United States Patent
Kung et al.

(10) Patent No.: US 7,278,144 B2
(45) Date of Patent: Oct. 2, 2007

(54) SYSTEM AND METHOD FOR MANAGING OPERATING SYSTEM OPTION VALUES

(75) Inventors: Ching-Yi Kung, Naperville, IL (US); Patrick Lee, Bolingbrook, IL (US)

(73) Assignee: Computer Associates Think, Inc., Islandia, NY (US)

(*) Notice: Subject to any disclaimer, the term of this patent is extended or adjusted under 35 U.S.C. 154(b) by 301 days.

(21) Appl. No.: 10/418,704

(22) Filed: Apr. 18, 2003

(65) Prior Publication Data

US 2003/0217188 A1    Nov. 20, 2003

Related U.S. Application Data

(60) Provisional application No. 60/373,946, filed on Apr. 19, 2002.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 15/16 | (2006.01) |
| G06F 9/00 | (2006.01) |
| G06F 9/24 | (2006.01) |

(52) U.S. Cl. ............ 719/330; 719/328; 719/329; 709/217; 709/218; 709/219; 713/1; 713/100

(58) Field of Classification Search ........ 719/328–330; 713/1, 100; 709/220–221, 217–219
See application file for complete search history.

(56) References Cited

U.S. PATENT DOCUMENTS 5,097,533 A * 3/1992 Burger et al. ............... 719/328
5,249,260 A    9/1993 Nigawara et al.
5,835,768 A    11/1998 Miller et al.
5,901,319 A *  5/1999 Hirst ........................... 717/164

(Continued)

FOREIGN PATENT DOCUMENTS

| EP | 1 031 920 A2 | 8/2000 |
| FR | 2 801 705 | 6/2001 |

OTHER PUBLICATIONS

International Search Report for PCT/US 03/12033, 7 pages, Mar. 1, 2004, Mar. 1, 2004.

*Primary Examiner*—William Thomson
*Assistant Examiner*—Qing-Yuan Wu
(74) *Attorney, Agent, or Firm*—Pillsbury Winthrop Shaw Pittman, LLP

(57) ABSTRACT

A method for managing operating system option values includes receiving a request to perform a function involving an option value in a computing device. The computing device is one of a plurality of computing devices, and at least two of the plurality of computing devices are associated with different operating systems. The method also includes identifying one or more commands associated with the requested function. The one or more commands are operable to cause the computing device to perform the requested function. The method further includes generating the one or more commands, communicating the one or more commands for execution at the computing device, receiving a response associated with the one or more commands, and making at least a portion of the response available.

21 Claims, 4 Drawing Sheets

U.S. PATENT DOCUMENTS

| | | | |
|---|---|---|---|
| 5,903,753 A * | 5/1999 | Bramnick et al. | 719/328 |
| 5,905,492 A | 5/1999 | Straub et al. | |
| 6,065,116 A | 5/2000 | Isaacson et al. | 713/1 |
| 6,112,301 A | 8/2000 | Johnson | |
| 6,131,190 A | 10/2000 | Sidwell | |
| 6,141,565 A | 10/2000 | Feuerstein et al. | |
| 6,161,176 A | 12/2000 | Hunter et al. | 713/1 |
| 6,199,117 B1 * | 3/2001 | Cox et al. | 719/328 |
| 6,446,255 B1 * | 9/2002 | Curtis et al. | 717/121 |
| 6,536,040 B1 * | 3/2003 | Curtis | 717/174 |
| 6,615,277 B1 * | 9/2003 | Curtis | 719/310 |
| 6,615,278 B1 * | 9/2003 | Curtis | 719/310 |
| 6,664,979 B1 | 12/2003 | Schofield et al. | |
| 6,775,789 B2 | 8/2004 | Elko et al. | |
| 6,816,866 B2 | 11/2004 | Weber | |
| 6,981,043 B2 * | 12/2005 | Botz et al. | 709/225 |
| 2001/0054039 A1 | 12/2001 | Weber | 707/3 |
| 2003/0177388 A1 * | 9/2003 | Botz et al. | 713/201 |

* cited by examiner

SYSTEM AND METHOD FOR MANAGING OPERATING SYSTEM OPTION VALUES

RELATED APPLICATIONS

This application claims priority to U.S. Provisional Application No. 60/373,946 entitled "System and Method for User Profile Synchronization" filed Apr. 19, 2002, which is incorporated herein by reference.

TECHNICAL FIELD

This disclosure relates generally to the field of operating systems, and more particularly to a system and method for managing operating system option values.

BACKGROUND

A computer operating system typically includes a registry that stores information associated with software applications executing in the operating system. For example, a system registry may store option values that control the behavior of the software application. Other computer operating systems lack a system registry, and the option values are stored in other data structures. The operating systems typically lack a standard, uniform method for accessing and retrieving the option values. As a result, applications that run in different operating system environments typically include multiple interfaces for accessing and retrieving the option values.

SUMMARY

The present disclosure provides a system and method for managing operating system option values. In particular, an access element in the system may provide a single point of entry for storing, retrieving, and modifying option values in different operating systems.

In one embodiment, a method for managing operating system option values includes receiving a request to perform a function involving an option value in a computing device. The computing device is one of a plurality of computing devices, and at least two of the plurality of computing devices are associated with different operating systems. The method also includes identifying one or more commands associated with the requested function. The one or more commands are operable to cause the computing device to perform the requested function. The method further includes generating the one or more commands, communicating the one or more commands for execution at the computing device, receiving a response associated with the one or more commands, and making at least a portion of the response available.

In particular embodiments, the request comprises an Application Program Interface (API) function call that invokes one of a get function, a set function, and a delete function. The request may be generated by a software application. The method may also include normalizing the option value retrieved from the computing device and placing the normalized option value into an output buffer.

BRIEF DESCRIPTION OF THE DRAWINGS

For a more complete understanding of this disclosure, reference is now made to the following descriptions, taken in conjunction with the accompanying drawings, in which.

DETAILED DESCRIPTION OF EXAMPLE EMBODIMENTS

Figure 1:
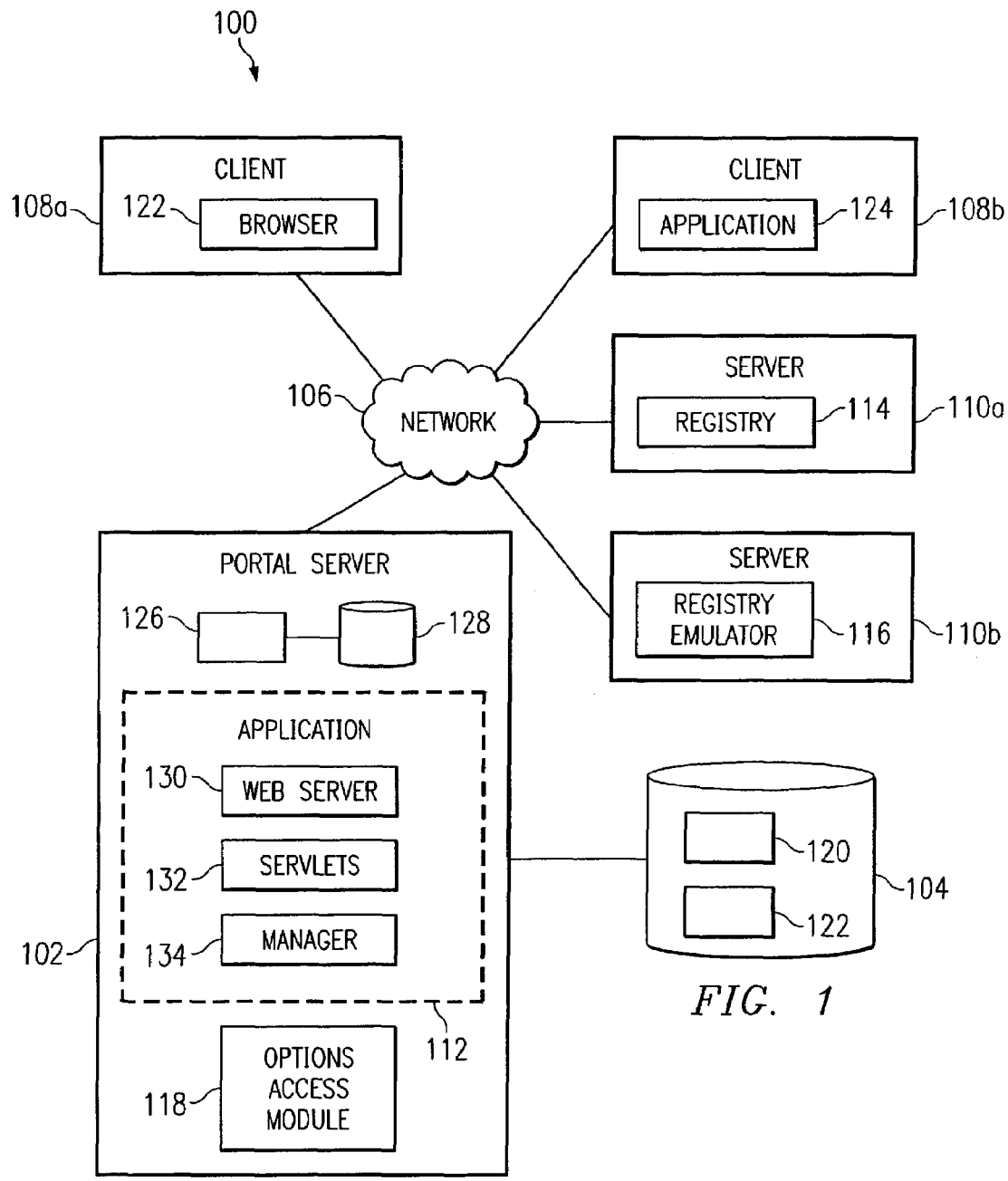
FIG. 1 is an exemplary block diagram illustrating an example system for managing operating system option values according to one embodiment of this disclosure.

FIG. 1 is an exemplary block diagram illustrating an example system 100 for managing operating system option values according to one embodiment of this disclosure. In the illustrated embodiment, system 100 includes an administration server 102, a database 104, a network 106, one or more clients 108, and one or more application servers 110. Other embodiments of system 100 may be used without departing from the scope of this disclosure.

In one aspect of operation, an application 112 in server 102 attempts to access an option value in a server 110. The option value in server 110 may reside in a registry 114, in a registry emulator 116, or in any other suitable structure. Because different servers 110 may use different operating systems, servers 110 may have different procedures for accessing the option values. To assist application 112 in accessing the option value, application 112 invokes a function in an options access module 118. Options access module 118 receives the information from application 112 and, based on that information, accesses the appropriate server 110 using the appropriate function calls. Options access module 118 may then create, retrieve, or modify option values in the server 110. By providing options access module 118 in system 100, application 112 can be easily designed to access option values by invoking a function of options access module 118. Application 112 need not include multiple interfaces for accessing option values in multiple servers 110, which may be using different operating systems.

In the illustrated embodiment, server 102 is coupled to database 104 and network 106. In this specification, the term "couple" refers to any direct or indirect communication between two or more components, whether or not those components are in physical contact with one another. Also, the term "communication" refers to communication between physically separate components or between components within a single physical unit. Server 102 performs one or more functions facilitating access to option values in servers 110. In this specification, the phrase "option value" refers to any information used to control or otherwise affect the function, execution, or behavior of one or more hardware, software, and/or firmware components in system 100. As particular example, option values may include settings used by software applications or user passwords controlling access to applications and data in servers 110. Server 102 may include any hardware, software, firmware, or combination thereof operable to facilitate access to option values in servers 110.

Database 104 is coupled to server 102. Database 104 stores and facilitates retrieval of information used by server 102. For example, database 104 may store access information 120. Access information 120 represents information used by access control module 118 to access option values in a server 110. As a particular example, access information 120 could identify a server 110 and the function calls used to get, set, and delete option values in that server 110. As another example, access information 120 could identify an operating system type associated with a server 110 and the function calls used to get, set, and delete option values in that type of operating system. Database 104 may include any hardware, software, firmware, or combination thereof operable to store and facilitate retrieval of information. Also, database 104 may use any of a variety of data structures, arrangements, and compilations to store and facilitate retrieval of information.

Network 106 is coupled to server 102 and clients 108. Network 106 facilitates communication between components of system 100. For example, network 106 may communicate Internet Protocol (IP) packets, frame relay frames, Asynchronous Transfer Mode (ATM) cells, or other suitable information between network addresses. Network 106 may include one or more local area networks (LANs), metropolitan area networks (MANs), wide area networks (WANs), all or a portion of a global network such as the Internet, or any other communication system or systems at one or more locations.

Client 108 is coupled to network 106. Client 108 may perform any of a variety of functions in system 100. For example, client 108 could allow a user to access server 110 and execute an application on that server 110. Client 108 may access the server 110 using a browser 122, a client application 124, or in any other suitable manner. Client 108 may include any hardware, software, firmware, or combination thereof operable to communicate with a server 110.

Server 110 is coupled to network 106. Server 110 may represent any suitable server or other computing device operable to store one or more option values. For example, server 110 may execute one or more applications, where the option values represent passwords in user accounts that manage access to the applications. Each server 110 may execute with an operating system, and the operating system used by one server 110 may differ from the operating system used by another server 110. In this specification, the term "each" refers to each of at least subset of the identified items. As a particular example, server 110 may execute with a WINDOWS NT operating system, a UNIX operating system, or a Java-based operating system.

Depending on the operating system, server 110 may or may not store option values in a registry. For example, the WINDOWS NT operating system supports a system registry 114. The UNIX operating system may not support a native system registry, and the Java environment may contain no support for registry data. In these environments, an emulator 116 that emulates the behavior of a system registry may be provided. Server 110 may comprise any hardware, software, firmware, or combination thereof operable to manage one or more option values.

In the illustrated example, server 102 includes a processor 126 and a memory 128. Processor 126 executes instructions and manipulates data to perform the operations of server 102. Although FIG. 1 illustrates a single processor 126 in server 102, multiple processors 126 may be used according to particular needs. Memory 128 stores and facilitates retrieval of information used by processor 126 to perform the functions of server 102. Memory 128 may, for example, store instructions to be performed by processor 126 and data used by processor 126. Memory 128 may include any hardware, software, firmware, or combination thereof operable to store and facilitate retrieval of information.

In the illustrated embodiment, application 112 is subdivided into a web server 130, one or more servlets 132, and a manager 134. In this example, application 112 represents an administration tool that can be used by a system administrator or other user to manage one or more aspects of system 100. For example, application 112 could support end user administration, where user accounts can be created, modified, or deleted in various environments like servers 110. As part of this end user administration, application 112 may use options access module 118 to access servers 110 and synchronize a user's passwords in each of the servers 110. This represents only an example environment in which options access module 118 may operate. Access module 118 could be used in any other suitable environment and access any other option values without departing from the scope of this disclosure.

In this example embodiment, web server 130 allows server 102 to communicate with a user, such as a system administrator at client 108, and exchange information contained in web pages. For example, the system administrator may wish to add a new user, and web server 130 could generate web pages containing forms that allow the system administrator to enter information about the new user.

Servlets 132 represent applets that may be executed by server 102 to perform a wide variety of functions in system 100. For example, one servlet 132 could discovery any component in system 100 having an IP address and any applications, directories, and user accounts contained in of these components. Information about each component, application, directory, and user account may be stored as an object 122, and the objects 122 may be stored in database 104 or another object repository. This information allows, for example, application 112 to discover and take control of the various security systems operating on different components in system 100. Other servlets 132 could allow a user to create new user accounts in those components, create user roles and assign users to the roles, create and administer user groups, and generate various maps showing the topology or other aspects of system 100.

Manager 134 manages the operation of application 112. For example, manager 134 may receive requests from the system administrator or other user to perform particular tasks. Manager 134 may identify the servlet 132 associated with the task, invoke the servlet 132, and ensure that the servlet 132 executed successfully.

The illustrated embodiment of application 112 is for illustration only. Any other suitable application 112 can be used in system 100. Application 112 may include any hardware, software, firmware, or combination thereof operable to perform a function involving an option value in a server 110 or other computing device. Application 112 may, for example, represent a C, C++, or Java application.

Figure 3:
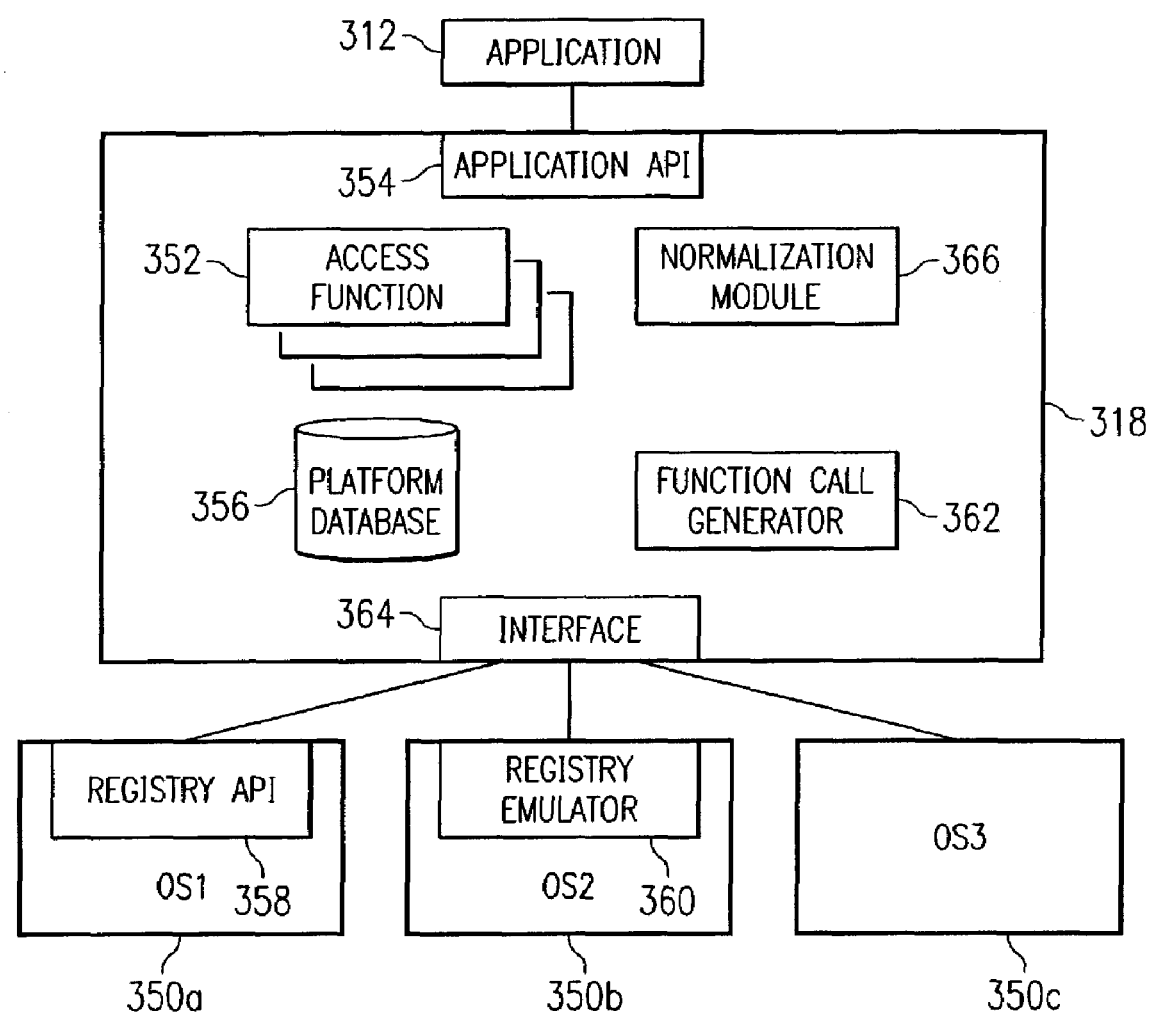
FIG. 3 is an exemplary block diagram illustrating an example access module according to one embodiment of this disclosure.

Options access module 118 allows application 112 to perform operations involving option values in servers 110. As an example, options access module 118 may include one or more functions for accessing, retrieving, and modifying option values in a server 110. Application 112 may invoke the functions of options access module 118 through an API or other suitable interface. Options access module 118 may use access information 120 to identify and generate the appropriate function calls used to perform the requested function. Options access module 118 may comprise any hardware, software, firmware, or combination thereof operable to facilitate access to option values in computing devices operating using one or more operating systems. As a particular example, options access module 118 may represent one or more software routines executed by processor 126. One example embodiment of an options access module is shown in FIG. 3, which is described below.

In a particular embodiment, an application 112 can invoke at least three types of functions in options access module 118. In this embodiment, the function calls include get, set, and delete. The get function retrieves one or more option values, the set function assigns a value to an option, and the delete function removes an option value. The function invocation from application 112 may include any suitable information. For example, the invocation may include information identifying a server 110 or other remote or local computing device, a component (such as an application or directory) on that server 110, an option, and/or a value associated with an option. Other or additional functions and function invocations can be supported according to particular needs.

In one aspect of operation, application 112 may need to access the option values in a server 110. Application 112 may call options access module 118, such as by invoking a function in options access module 118 using an API. Options access module 118 may identify the server 110 or the type of server 110 that application 112 wants to access, retrieve the appropriate access information 120, and access the option values in server 110 using access information 120. If application 112 requests retrieval of the option values, options access module 118 may retrieve the option values, normalize the option values by placing the values into a standard format, and communicate the values to application 112. By allowing applications 112 to access the option values through options access module 118, applications 112 need not be programmed to access option values in each type of server operating system.

Although FIG. 1 illustrates one example of a system 100 for managing operating system option values, various changes may be made to system 100. For example, while FIG. 1 illustrates one example environment in which options access module 118 may operate, any other suitable environment can be used. Also, the application 112 illustrated in FIG. 1 is for illustration only. Any other suitable application can be used with options access module 118. Further, although FIG. 1 illustrates application 112 and options access module 118 as separate elements, options access module 118 could form part of an application 112. In addition, options access module 118 has been described as facilitating access to option values in servers 110. Options access module 118 could also be used to facilitate access to option values in other components, such as other computing devices coupled to network 106.

Figure 2:
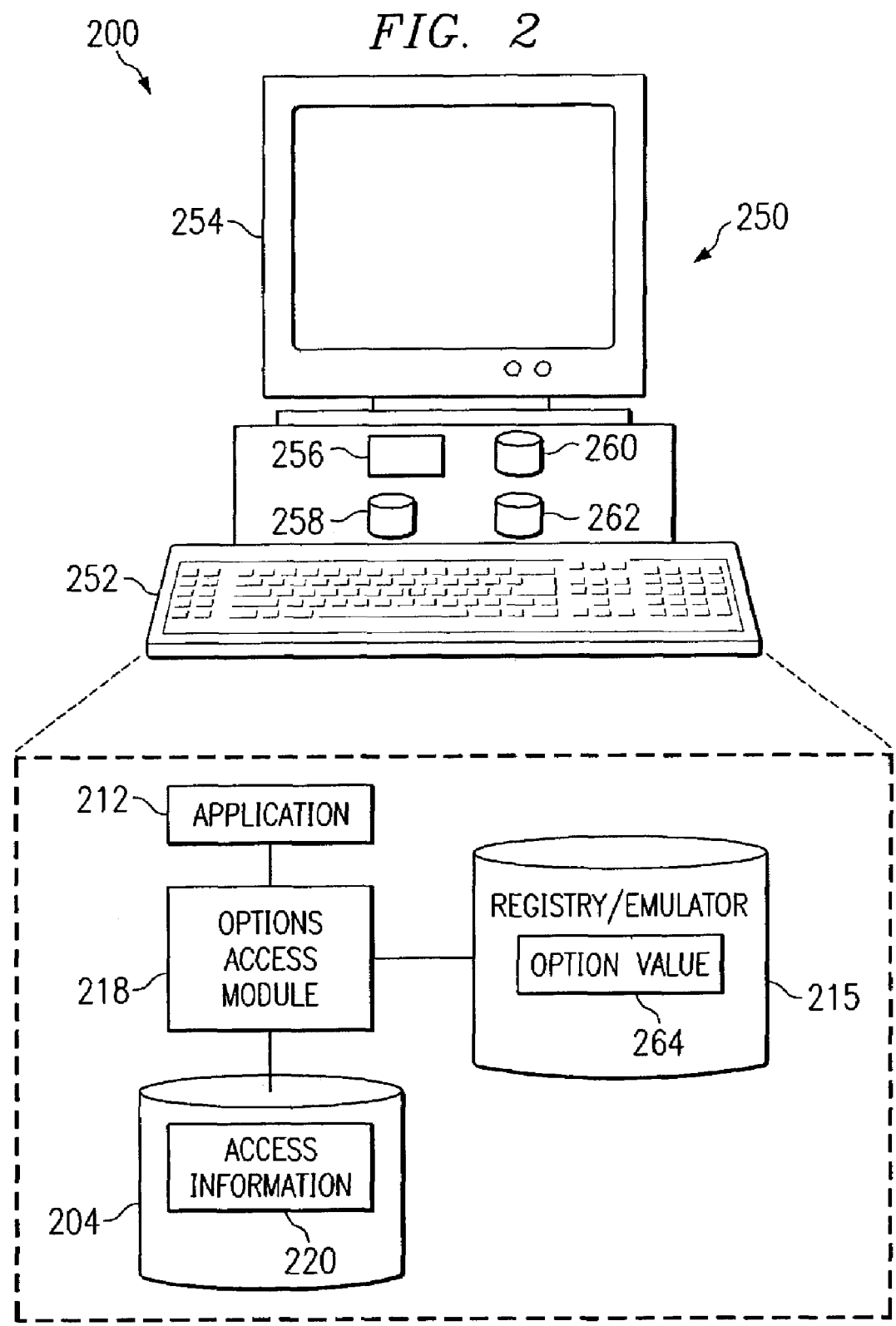
FIG. 2 is an exemplary block diagram illustrating another example system for managing operating system option values according to one embodiment of this disclosure.

FIG. 2 is an exemplary block diagram illustrating another example system 200 for managing operating system option values according to one embodiment of this disclosure. In the illustrated embodiment, system 200 includes a host computer 250 having an application 212 and an options access module 218.

In the illustrated embodiment, host 250 may execute with any of the well-known MS-DOS, PC-DOS, OS-2, MAC-OS, WINDOWS, UNIX, LINUX, or other appropriate operating systems. Host 250 could represent a desktop computer, a laptop computer, a server computer, or other suitable computing or communicating device. Host 250 may include an input device 252, an output device 254, one or more processors 256, a random access memory (RAM) 258, a read-only memory (ROM) 260, and a CD, DVD, hard drive, or other magnetic or optical storage device 262. Input device 252 may, for example, include a keyboard, mouse, graphics tablet, touch screen, pressure-sensitive pad, joystick, light pen, microphone, or other suitable input device. Output device 254 may, for example, include a video display, a printer, a disk drive, a plotter, a speaker, or other suitable output device.

Items within the dashed lines in FIG. 2 represent exemplary functional operation and data organization of the associated components of system 200. In the illustrated embodiment, host 250 includes application 212, options access module 218, a registry/emulator 215 containing one or more option values 264, and a database 204 containing access information 220.

Application 212, options access module 218, and database 204 may the same as or similar to application 112, options access module 118, and database 104 of FIG. 1. Application 212 may represent any application that accesses, retrieves, or modifies option values 264 in host 250. For example, application 212 could represent a diagnostic tool that uses option values 264 to identify problems with host 250. In a particular embodiment, application 212 could represent an application that may run in different operating system environments.

Registry/emulator 215 may represent a registry 114, a registry emulator 116, or any other suitable structure that contains or otherwise supports one or more option values 264. Options access module 218 facilitates access by application 212 to option values 264. For example, application 212 may attempt to access option values 264 by invoking a get, set, or delete function in options access module 218. Options access module 218 uses access information 220 to identify the appropriate function calls used to retrieve, set, or delete option values 264 in registry/emulator 215. The access information 220 in database 204 may or may not be limited to the specific operating system used by host 250. Options access module 218 generates the appropriate function calls and communicates the function calls to registry/emulator 215. If application 212 requests retrieval of the option values, options access module 218 may normalize the retrieved values and communicate them to application 212.

Although FIG. 2 illustrates another example of a system 200 for managing operating system option values, various changes may be made to system 200. For example, while FIG. 2 illustrates another example environment in which options access module 218 may operate, any other suitable environment can be used. Also, while FIG. 2 illustrates application 212 and options access module 218 as separate elements, options access module 218 could form part of an application 212.

FIG. 3 is an exemplary block diagram illustrating an example access module 318 according to one embodiment of this disclosure. Access module 318 facilitates access by an application 312 to option values supported by computing devices that operate in different operating system environments 350. Access module 318 may, for example, be useful as options access module 118 of FIG. 1 or options access module 218 of FIG. 2.

In the illustrated example, access module 318 includes access functions 352. Access functions 352 represent various functions that can be invoked by application 312 to access, retrieve, and modify option values in environments 350. For example, access functions 352 may cause access module 318 to get, set, or delete option values. Multiple access functions 352 may be used for each of these three operations. As a particular example, one get function 352 may cause access module 318 to retrieve a single option value from a remote computing device. Another get function 352 may cause access module 318 to retrieve a single option value from a local computing device. Yet another get function 352 may cause access module 318 to recursively retrieve multiple option values from a computing device. Any other suitable access functions could be used in access module 318.

To allow application 312 to invoke access functions 352, access module 318 includes an application API 354. Application API 354 allows applications 312 operating in different operating system environments to invoke functions 352 in access module 318 using normalized function calls. In a particular embodiment, when application 312 invokes a function 352, application 312 may communicate an API call containing the identity of a remote or local computing device, a component operating on that device, an option, and/or a value associated with an option. These inputs may be supplied individually, collectively using an input buffer, using a combination of individual inputs and an input buffer, or in any other suitable manner.

Once application 312 invokes a function 352, access module 318 may identify the function calls needed to perform the requested function in the identified computing device. Access module 318 includes or otherwise has access to a platform database 356. Platform database 356 includes access information that identifies one or more function calls used to get, set, or delete option values in a particular operating system environment 350. For example, an environment 350a may support a system registry that performs functions invoked through a registry API 358. In that case, platform database 356 may identify an API function call or calls that cause the registry in environment 350a to retrieve the option value. As another example, an environment 350b may lack support for a system registry, but a registry emulator 360 may emulate the behavior of the system registry. In this case, platform database 356 may identify an API or emulator function call that causes the emulator 360 to delete a specified option value. Other environments 350c may lack a registry API 358 or emulator 360, such as an environment that has a registry but no support for a registry API. For these environments 350c, platform database 356 may identify how option values may be accessed and managed.

After identifying the function call or calls needed to perform the requested function, a function call generator 362 generates the actual function calls. For example, generator 362 may create function calls containing the appropriate parameters for a particular operating system environment 350. Generator 362 may also supply appropriate values for the parameters in the function calls based on the input from the invoking application 312. As a particular example, if application 312 is setting the value of an option in a computing device, generator 362 may insert the name of the option and the value of the option into the command. The generated function calls are communicated to the specified computing device using interface 364. Interface 364 may represent any suitable interface, such as a network interface card or wireless connection.

The function calls may generate a response from the computing device operating in an environment 350 or from access module 318. For example, a response from the computing device may include a success code indicating whether the requested function was performed. As particular examples, the computing device may generate a response saying that the function was completed successfully, the function could not complete successfully, or the function call had invalid or out-of-order field parameters. Access module 318 could also generate an error message, such as when access module 318 could not communicate the function calls to a remote computing device. In addition, if the function calls attempt to retrieve option values, access module 318 could receive the option values from the computing device.

The response information may be made available to application 312. In one embodiment, when application 312 invokes a function 352, application 312 identifies an output buffer. The response information may be placed in the output buffer by access module 318, and application 312 may retrieve the response information from the output buffer.

Because the format of the option values and other responses may differ between environments 350, a normalization module 366 normalizes the responses. For example, normalization module 366 may receive the option values from an environment 350 and place the option values in a standard format. Any suitable format can be used to normalize the option values.

Although FIG. 3 illustrates one example of an access module 318, various changes may be made to access module 318. For example, FIG. 3 illustrates one example functional division within access module 318. Various components of access module 318 may be combined or omitted, and additional components may be added according to particular needs. Also, platform database 356 has been described as storing information based on the type of operating system environment 350 associated with a computing device. Platform database 356 could store information in any other suitable manner. As a particular example, platform database 356 could identify the function calls used by each individual computing device, even if multiple computing devices use the same function calls.

Figure 4:
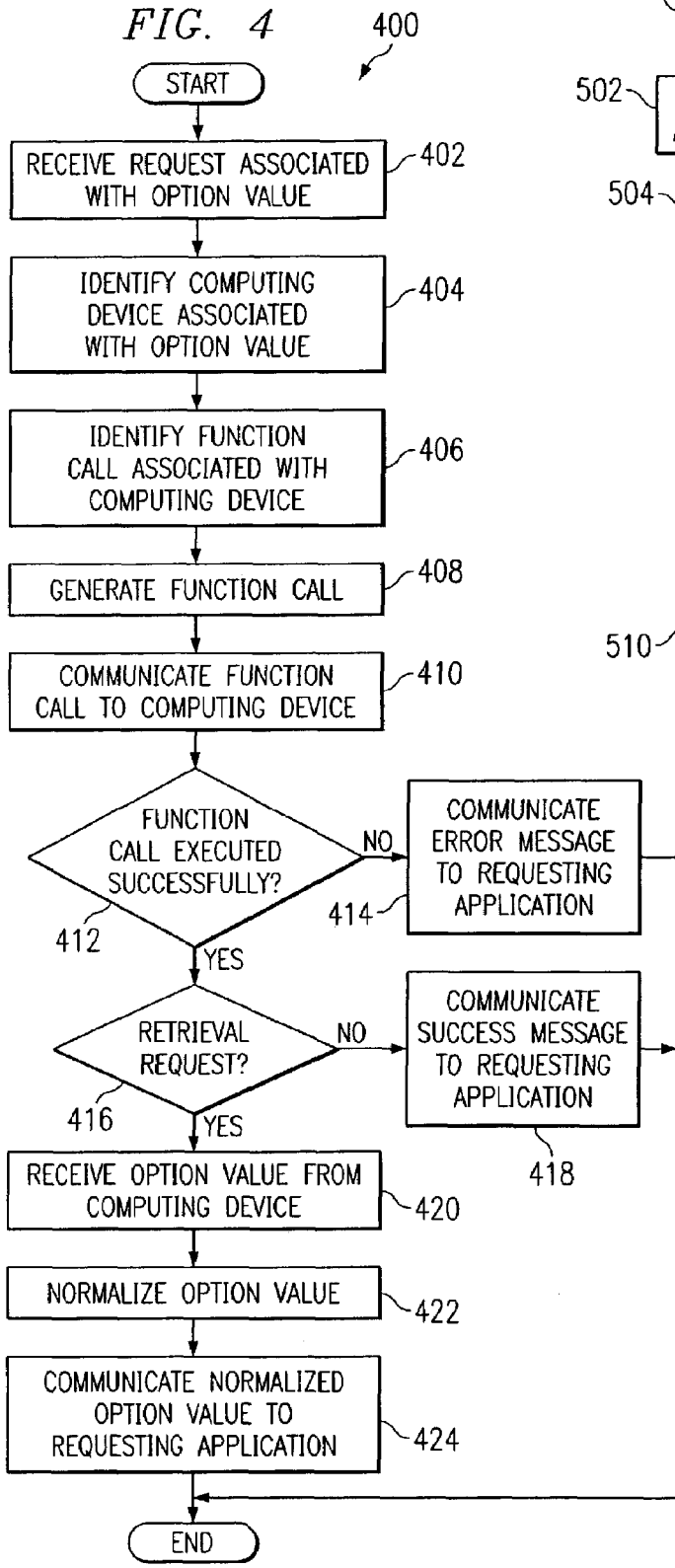
FIG. 4 is an exemplary flow diagram illustrating an example method for managing operating system option values at an access module according to one embodiment of this disclosure.

FIG. 4 is an exemplary flow diagram illustrating an example method 400 for managing operating system option values at an access module according to one embodiment of this disclosure. Method 400 is described with respect to system 100 of FIG. 1 using access module 318 of FIG. 3. Method 400 may be used with any other suitable system and any other suitable access module.

Server 102 receives a request from an application 112 requesting access to an option value at step 402. This may include, for example, application 112 invoking an access function 352 in access module 318 using an API function invocation. Server 102 identifies a computing device associated with the option value at step 404. This may include, for example, access module 318 identifying a server 110 using the information contained in the function invocation.

Server 102 identifies one or more function calls or other commands used to perform the requested function in the identified computing device at step 406. This may include, for example, access module 318 accessing platform database 356, identifying the operating system environment 350 associated with the identified server 110, and identifying the function calls used to perform the requested function in the identified environment 350. The function calls associated with a requested function may be referred to as a "command set." Server 102 generates the function calls at step 362. This may include, for example, function call generator 362 using the format of the function calls retrieved from platform database 356 to generate function calls containing the appropriate parameters. Server 102 communicates the function calls to the computing device at step 410. This may include, for example, access module 318 communicating the function calls to server 110 using interface 364.

Server 102 determines whether the function calls were executed successfully at the computing device at step 412. This may include, for example, access module 318 determining whether a remote computing device could be contacted. This may also include access module 318 receiving a response from the computing device, where the response indicates whether the function calls were executed successfully. If the function calls were not executed successfully, server 102 communicates an error message to the application 112 that invoked the function at step 414. This may include, for example, access module 318 generating a message containing a code identifying the reason for the failure and placing the message in an output buffer accessible by application 112.

If the function calls executed successfully, server 102 determines whether the requested function was a retrieval (get) function at step 416. If not a retrieval function, the requested function could represent a set function or a delete function. Server 102 may then communicate a success message to the application 112 that invoked the set or delete function at step 418. This may include, for example, access module 318 generating a message containing a code indicating a successful set or delete operation and placing the message in the output buffer.

If the requested function was a retrieval function, server 102 receives the requested option value from the computing device at step 420. This may include, for example, access module 318 receiving the requested option value from server 110 using interface 364. Server 102 normalizes the option value at step 422. This may include, for example, normalization module 366 placing the option value into a standard format. The format used by normalization module 366 may represent any suitable format. The standard format may allow different applications 112 that use access module 318 to understand the information received from access module 318. Server 102 communicates the normalized option value to the application 112 that invoked the get function at step 424. This may include, for example, access module 318 generating a message containing the option value and placing the message in the output buffer.

Although FIG. 4 illustrates one example of a method 400 for managing operating system option values at an access module, various changes may be made to method 400. For example, FIG. 4 illustrates access module 318 identifying all of the function calls associated with the request and then generating and communicating the function calls. Access module 318 could also identify, generate, and communicate one function call at a time until the requested operation fails or completes successfully. Also, access module 318 could be operable to normalize the option values into one of multiple formats, and application 112 invoking access module 318 could identify the format desired.

Figure 5:
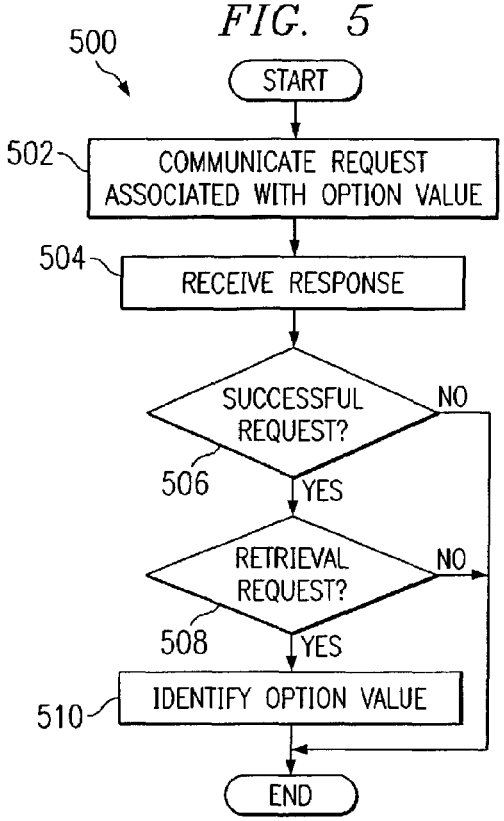
FIG. 5 is an exemplary flow diagram illustrating an example method for accessing operating system option values at an application according to one embodiment of this disclosure.

FIG. 5 is an exemplary flow diagram illustrating an example method 500 for accessing operating system option values at an application according to one embodiment of this disclosure. Method 500 is described with respect to system 100 of FIG. 1 using access module 318 of FIG. 3. Method 500 may be used with any other suitable system and any other suitable access module.

Application 112 communicates a request to access an option value in a computing device at step 502. This may include, for example, application 112 invoking an access function 352 in access module 318 using an API function call. The function invoked may include a get single option value function, a get multiple option values function, a set function, or a delete function. In a particular embodiment, the API function call may include information identifying a remote or local computing device, a component on that computing device, an option, and/or a value associated with an option. Some, all, or none of these inputs may be provided individually, together in an input buffer, or in any other suitable manner. The API function invocation may further identify an output buffer to be used by access module 318 to provide the output results to application 112.

Application 112 receives a response from access module 318 at step 504. This may include, for example, access module 318 placing a message in the identified output buffer. This may also include access module 318 notifying application 112 that the message is available and application 112 accessing the output buffer.

Application 112 determines whether the requested function was successfully performed at step 506. This may include, for example, application 112 examining the message from access module 318 and determining if the message includes a code indicating a successful operation. If unsuccessful, method 500 ends. Application 112 may take any other suitable action at that point. For example, application 112 could terminate execution with an error message, notify the user, or attempt to access the option value again.

If the requested function was a successful retrieval function, application 112 identifies the requested option value at step 510. This may include, for example, application 112 examining the information contained in the output buffer and identifying which of the information corresponds to the options value. Because access module 318 may have placed the option value into a normalized format, application 112 may easily identify the option value. Also, the format of the option value and the method of retrieving the option value may differ depending on the operating system environment 350. By allowing access module 318 to retrieve and normalize the option value, application 112 need not be programmed to perform the various retrieval methods or to receive information in multiple formats.

While the present disclosure has been described in terms of preferred embodiments and generally associated methods, alterations and permutations of the preferred embodiments and method will be apparent to those skilled in the art. Accordingly, the above description of preferred exemplary embodiments does not define or constrain the present disclosure. Other changes, substitutions, and alterations are also possible without departing from the spirit and scope of the present disclosure, as defined by the following claims.

What is claimed is:

1. A computer implemented method for managing operating system option values, comprising:

receiving a first request to perform a function involving a registry option value from a first requesting application, the first requesting application operating on a first operating system;

receiving a second request to perform the function involving the registry option value from a second requesting application, the second requesting application operating on a second operating system, wherein the first and second operating systems are different from one another;

identifying a set of commands associated with the registry option value, the identified set of commands operable to perform the first and the second requested function, wherein the set of commands are identified based on an operating system identified as being associated with the registry option value;

communicating the identified set of commands to the registry for execution of the first and the second requested function;

receiving a first response associated with the execution of the communicated set of commands;

receiving a second response associated with the execution of the communicated set of commands;

communicating at least a portion of the first response to the first requesting application; and communicating at least a portion of the second response to the second requesting application.

2. The method of claim 1, wherein the communicated set of commands include one or more values inserted for one or more parameters in the identified set of commands.

3. The method of claim 1, wherein at least one of the first and the second request include an Application Program Interface (API) function call.

4. The method of claim 3, wherein the API function call invokes one of a get function, a set function, and a delete function.

5. The method of claim 3, wherein the identified set of commands includes at least one of a registry API function call and a registry emulator command.

6. The method of claim 1, wherein:

the first and the second response include data associated with executing the requested function on the registry option value; and communicating at least a portion of the first and the second response includes:

normalizing the data associated with executing the requested function on the registry option value; and placing the normalized option value into an output buffer.

7. The method of claim 1, wherein the registry option value includes a user password.

8. A system for managing operating system option values, comprising:

a memory operable to store a plurality of sets of commands, each set of commands operable to perform a function involving a registry option value; and one or more processors collectively operable to:

receive a first request to perform the function involving the registry option value from a first requesting application, the first requesting application operating on a first operating system;

receive a second request to perform the function involving the registry option value from a second requesting application, the second requesting application operating on a second operating system, wherein the first and second operating systems are different from one another;

identify one of The sets of commands associated with the registry option value, the identified set of commands operable to perform the first and the second requested function, wherein the set of commands are identified based on an operating system identified as being associated with the registry option value;

communicate the identified set of commands to the registry for execution of the first and the second requested function;

receive a first response associated with the execution of the communicated set of commands;

receive a second response associated with the execution of the communicated set of commands;

communicate at least a portion of the first response to the first requesting application; and communicate at least a portion of the second response to the second requesting application.

9. The system of claim 8, wherein the one or more processors are collectively operable to insert in the communicated set of commands one or more values for one or more parameters in The identified set of commands.

10. The system of claim 8, wherein at least one of the first and the second request include an Application Program Interface (API) function call.

11. The system of claim 10, wherein the API function call invokes one of a get function, a set function, and a delete function.

12. The system of claim 10, wherein the identified set of commands includes at least one of a registry API function call and a registry emulator command.

13. The system of claim 8, wherein:

the first and the second response include data associated with executing the requested function on the registry option value; and the one or more processors are collectively operable to communicate at least a portion of the first and the second response by:

normalizing the data associated with executing the requested function on the registry option value; and placing the normalized option value into an output buffer.

14. A computer readable medium containing computer-executable instructions for managing operating system option values, the instructions operable when executed by one or more processors to:

receive a first request to perform a function involving registry option value from a first requesting application, the first requesting application operating on a first operating system;

receive a second request to perform the function involving the registry option value from a second requesting application, the second requesting application operating on a second operating system, wherein the first and second operating Systems are different from one another;

identify a set of commands associated with the registry option value, the identified set of commands operable to perform the first and the second requested function, wherein the set of commands are identified based on an operating system identified as being associated with the registry option value;

communicate the identified set of commands to the registry for execution of the first and the second requested function;

receive a first response associated with the execution of the communicated set of commands;

receive a second response associated with the execution of the communicated set of commands;

communicate at least a portion of the first response to the first requesting application; and communicate at least a portion of the second response to the second requesting application.

15. The computer readable medium of claim 14, the communicated set of commands including one or more values inserted for one or more parameters in the identified Set of commands.

16. The computer readable medium of claim 14, wherein at least one of the first and the second request include an Application Program Interface (API) function call.

17. The computer readable medium of claim 16, wherein the API function call invokes one of a get function, a set function, and a delete function.

18. The computer readable medium of claim 16, wherein the identified set of commands includes at least one of a registry API function call and a registry emulator command.

19. The computer readable medium of claim 14, wherein:
the first and the second response include data associated with executing the requested function on the registry option value; and
the instructions further operable to communicate at least a portion of the first and the second response by:
normalizing the data associated with executing the requested function on the registry option value; and
placing the normalized option value into an output buffer.

20. A computer implemented method for accessing operating system option values, comprising:
communicating a first request to perform a function involving registry option value by a first requesting application, the first requesting application operating on a first operating system;
communicating a second request to perform the function involving the registry option value by a second requesting application, the second requesting application operating on a second operating system, wherein the first and second operating systems are different from one another, wherein at least one of The first and the second request include an Application Program interface (API) function call communicated to an access element and invoking one of a get function, a set function, and a delete function in the access element, wherein the access element is operable to identify at least one set of commands associated with the registry option value, the at least one set of commands operable to perform the first and the second requested function, the at least one set of commands including at least one of a registry API function call and a registry emulator command;
receiving a first response associated with execution of the first request, the first response received by the first requesting application and including normalized data associated with execution of the requested function on the registry option value; and
receiving a second response associated with the execution of second request, the second response received by the second requesting application and including normalized data associated with execution of the requested function on the registry option value.

21. The method of claim 20, wherein receiving the first and the second response includes:
accessing an output buffer containing the registry option value in a normalized format; and
retrieving the normalized registry option value from the accessed output buffer.

* * * * *